United States Patent [19]

Kerr

[11] Patent Number: 5,115,501

[45] Date of Patent: May 19, 1992

[54] PROCEDURE FOR AUTOMATICALLY CUSTOMIZING THE USER INTERFACE OF APPLICATION PROGRAMS

[75] Inventor: Linda L. Kerr, North Richland Hills, Tex.

[73] Assignee: International Business Machines Corporation, Armonk, N.Y.

[21] Appl. No.: 267,420

[22] Filed: Nov. 4, 1988

[51] Int. Cl.⁵ .................. G06F 15/40; G06F 15/403; G06F 15/417; G06F 15/74
[52] U.S. Cl. .......................... 395/600; 364/230.3; 364/231.31; 364/280; 364/280.7; 364/281.3; 364/281.7; 364/282.1; 364/282.3; 364/283.1; 364/283.3; 364/283.4; 364/284.4; 364/286.1; 364/286.2; 364/DIG. 1; 395/700
[58] Field of Search ... 364/200 MS File, 900 MS File, 364/192; 371/53

[56] References Cited

U.S. PATENT DOCUMENTS

| | | | |
|---|---|---|---|
| 4,107,784 | 8/1978 | Van Bemmelen | 364/900 |
| 4,484,304 | 11/1984 | Anderson et al. | 364/900 |
| 4,688,195 | 8/1987 | Thompson et al. | 364/300 |
| 4,845,715 | 7/1989 | Francisco | 371/53 |
| 4,860,204 | 8/1989 | Gendron et al. | 364/300 |
| 4,870,561 | 9/1989 | Love et al. | 364/192 |
| 4,907,274 | 3/1990 | Nomura et al. | 364/513.5 |
| 4,964,077 | 10/1990 | Eisen et al. | 364/900 |

OTHER PUBLICATIONS

Database—A Primer, Addison-Wesley Publishing Comany, C. J. Date, pp. 38-41, 1983.

Primary Examiner—Thomas C. Lee
Assistant Examiner—Daniel Pan
Attorney, Agent, or Firm—Whitham & Marhoefer

[57] ABSTRACT

An application program automatically creates and presents a customized user interface. This is done by determining a set of operations which is appropriate for the current user based on various relevant characteristics of the user. The application program presents only the specified operations in the menus, icons, application bars or other interface components of the application program.

15 Claims, 6 Drawing Sheets

PROGRAM TO CREATE AND EDIT CUSTOMIZATION TABLE

FIG. 1

SAMPLE CUSTOMIZATION TABLE

| | | FAMILIARITY LEVEL | | |
|---|---|---|---|---|
| | | NOVICE | MODERATE | FREQUENT |
| JOB TYPE | CLERICAL | CALENDAR<br>LIMITED NOTE<br>LIMITED EDIT<br>MAIL<br>MESSAGE<br>REMINDER<br>FILE | CALENDAR<br>EXPANDED NOTE<br>EXPANDED EDIT<br>MAIL<br>MESSAGE<br>REMINDER<br>TEXT DOCUMENTS<br>EXPANDED FILE | CALENDAR<br>EXPANDED NOTE<br>EXPANDED EDIT<br>MAIL<br>MESSAGE<br>REMINDER<br>COMPOSITE DOCUMENTS<br>GRAPHICS<br>EXPANDED FILE |
| | EXECUTIVE | CALENDAR<br>LIMITED NOTE<br>MESSAGE<br>REMINDER<br>LIMITED SPREAD SHEET<br>LIMITED DATA BASE | CALENDAR<br>EXPANDED NOTE<br>MESSAGE<br>REMINDER<br>SPREAD SHEET<br>DATA BASE | CALENDAR<br>EXPANDED NOTE<br>MESSAGE<br>REMINDER<br>EXPANDED SPREAD SHEET<br>EXPANDED DATA BASE |
| | PROFESSIONAL / TECHNICAL | CALENDAR<br>LIMITED NOTE<br>MESSAGE<br>REMINDER<br>CALCULATOR<br>LIMITED GRAPHICS<br>LIMITED DATA BASE | CALENDAR<br>EXPANDED NOTE<br>MESSAGE<br>REMINDER<br>CALCULATOR<br>EXPANDED GRAPHICS<br>DATA BASE | CALENDAR<br>EXPANDED NOTE<br>MESSAGE<br>REMINDER<br>CALCULATOR<br>EXPANDED GRAPHICS<br>EXPANDED DATA BASE |
| | SCIENTIFIC/ ENGINEERING | CALENDAR<br>LIMITED NOTE<br>MESSAGE<br>REMINDER<br>LIMITED CAD<br>LIMITED MATH<br>LIMITED DATA BASE | CALENDAR<br>EXPANDED NOTE<br>MESSAGE<br>REMINDER<br>EXPANDED CAD<br>MATH<br>DATA BASE | CALENDAR<br>EXPANDED NOTE<br>MESSAGE<br>REMINDER<br>EXPANDED CAD<br>EXPANDED MATH<br>EXPANDED DATA BASE |

FIG.2A
"NEW" LEVEL
CLERICAL

FIG.2B
"MODERATE" LEVEL
CLERICAL

FIG. 5
AUTOMATIC USER INTERFACE CUSTOMIZATION PROCEDURE

PROCEDURE FOR AUTOMATICALLY CUSTOMIZING THE USER INTERFACE OF APPLICATION PROGRAMS

BACKGROUND OF THE INVENTION

1. Field of the Invention

The present invention generally relates to user interfaces to software applications and, more particularly, to the creation, maintenance and use of a user interface to an application program which has been tailored to various characteristics of the current user.

2. Description of the Prior Art

Computer users vary in many respects, such as job duties, level of familiarity with various application programs, need to use various operations of application programs, frequency of use of various operations of application programs, and right of access to different operations of application programs. Most application programs, however, present a single user interface which does not take into account the individual characteristics of the current user. The result is that the user is presented a user interface which may be confusing, inefficient, insufficiently restricted, or otherwise inappropriate for him.

The user interface for an application program can take many forms, such as menus, sets of icons, sets of action bars, or a command line. The user normally selects an operation or moves through the hierarchy of menus, etc. by some combination of keystrokes, cursor movements, mouse operations, commands or the like.

At any given time, the array of choices presented to the user may be so large as to be confusing, to take up an undue amount of the screen space, or to take up so much memory with the code underlying the choices that system performance is compromised. The array may contain operations which the user does not need or does not yet know how to use. In addition, the user may find it necessary or convenient to access in close sequence operations of a program which appear in different aspects (e.g., menus or action bars) of the user interface. In such a case, it is cumbersome to traverse from menu to menu or from action bar to action bar.

As the user gains familiarity with the application program or as his needs change, he may "outgrow" the user interface, requiring access to a broader or different set of operations.

A number of rudimentary attempts have been made to alter the user interface of an application program, or at least the user's access to aspects of the program or manipulated data, in response to a characteristic of the user. Perhaps the earliest example is the assignment of access levels to database users so that some users may not have write access to certain files or fields in files, some users may not have read access to certain files or fields, and some users may not even be able to access the database at all. This feature is now common among commercially available database management systems.

A more closely related technique is the provision of a software switch, set by the user, which governs whether menus or other explanatory aspects of the user interface are visible on the screen. Thus, a novice user would set the switch to make menus appear on the screen so that he may use the menus as a guide in performing operations. On the other hand, an advanced user would set the switch to remove the menus from the screen so that he could view data in the entire screen, unobstructed by the menu. The word processing program WordStar (trademark of MicroPro) uses such an approach, implemented in the form of differing levels of "help".

An even more recent trend has been to provide so-called "soft interfaces" to application programs, which allow the user to emulate to a degree the interface of a program with which he is already familiar or to create an interface which is purely individual. The word processing program Sprint (trademark of Borland) provides a soft interface which enables the user to operate it with the commands used by WordPerfect (trademark of WordPerfect), WordStar, Word (trademark of Microsoft), certain other word processors, or commands of the user's own selection.

Finally, the methodology exists on a systems level to allow programmers to automate the creation of menus, etc. in the course of application development. The programmer specifies a list of operations, codes, explanatory material, and format parameters, and the menu generator creates a menu for presentation on the screen.

There is nothing in the prior art, however, which enables the user or system administrator to select arbitrarily from the range of operations offered by an application program and thereby create an interface which is truly customized to the level of familiarity, type of job, level of access and other characteristics of the user.

SUMMARY OF THE INVENTION

It is therefore an object of the present invention to provide a technique for specifying the range of operations to be presented by the user interface of an application program which is customized for particular users or classes of users and is readily changeable by the user or system administrator.

It is another object of the invention to provide a program for creating and displaying the relevant, customized user interface which has been specified by the user or system administrator.

According to the invention, the user interface of an application program is restructured in a form customized for the current user each time he invokes the program. The user or system administrator first creates a customization table which specifies the operations to be made available to particular classes of users or even individual users. For example, a matrix could be created which specifies certain groups of operations for presentation to users depending on the users' type of job and degree of familiarity with the application program. The customization table could be modified whenever desired. Each time a user invokes the application program, the appropriate set of operations for the user is determined from the customization table by searching a user profile table based on the user's identifier, prompting the user to enter his relevant characteristics, or other means.

Because the user's level of familiarity with the application program will frequently be the most important characteristic, a count of the number of times each user has invoked the application program could be stored and used to estimate the user's level of familiarity and select the appropriate set of operations for the user, automatically raising the level of user interface as thresholds are reached. The user could be permitted to override the system count if it led to an inappropriate level of interface.

Similar types of automatic upgrading could occur by monitoring the number of serious errors that occur in each session and raising the complexity of the user interface if fewer than a certain number occur during the session, or by monitoring calls to operations not presented by the interface and adding an operation to the user interface if it is called more than a certain number of times during the session.

The set of operations appropriate to the user is then used to generate menus, icons, action bars or other interface components which present only the specified operations, rather than the full, and possibly confusing, inefficient or otherwise inappropriate, range of operations available within the application program.

BRIEF DESCRIPTION OF THE DRAWINGS

The foregoing and other objects, aspects and advantages of the invention will be better understood from the following detailed description of a preferred embodiment of the invention with reference to the drawings, in which:

FIGS. 3 to 12, taken together, constitute a flow chart of the user interface customization procedure according to the invention in which the connectors in each of the figures indicate the manner in which the several figures are interconnected to form the flow chart and wherein

DETAILED DESCRIPTION OF A PREFERRED EMBODIMENT OF THE INVENTION

Figure 1:
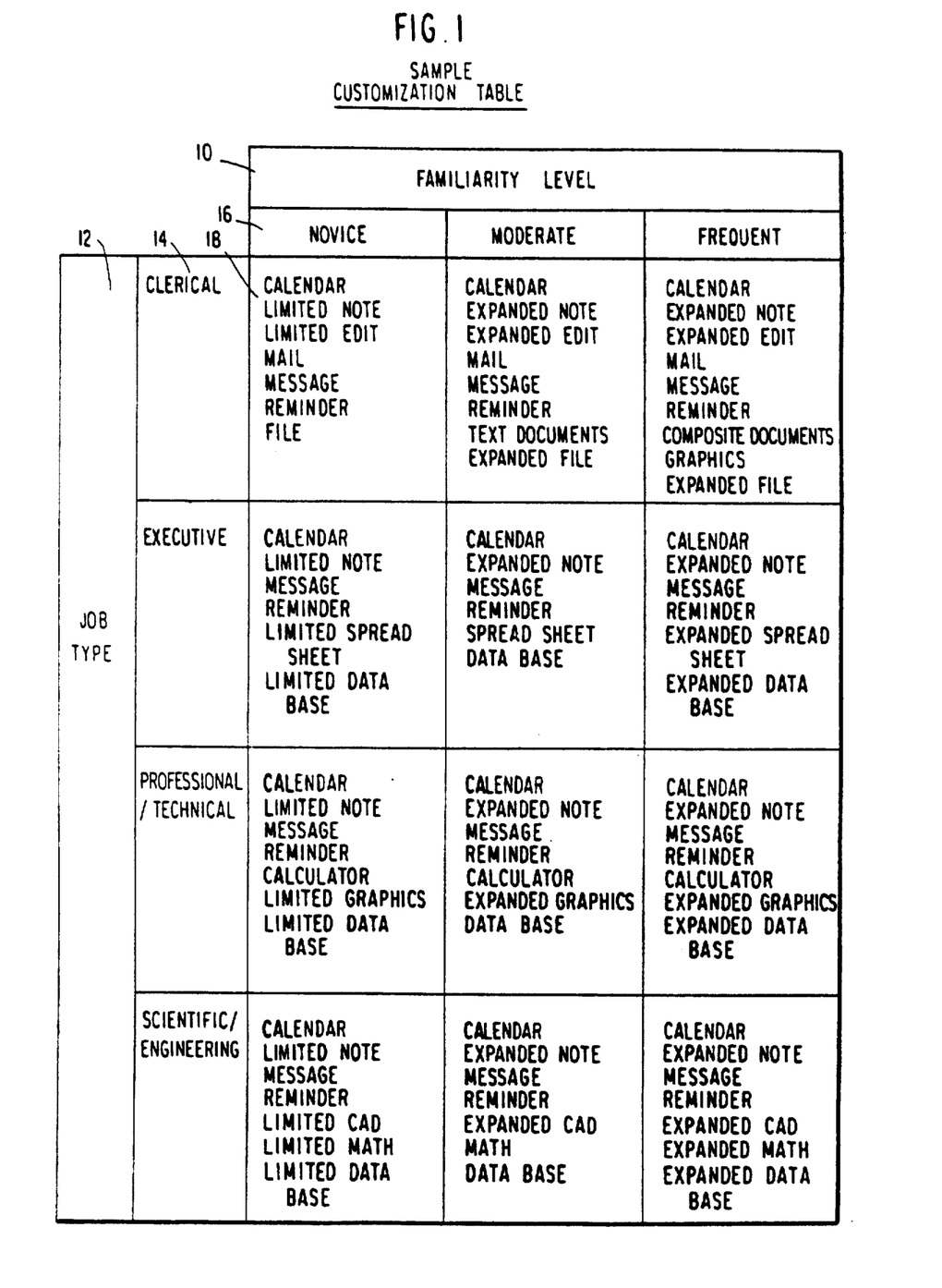
FIG. 1 illustrates a typical table specifying the operations that might be made available to various types of users with various levels of experience with the application program in the practice of the invention.

Referring now to the drawings, and more particularly to FIG. 1, the procedure according to the invention creates, stores in electronic storage, and utilizes a customization table which specifies sets of operations to be presented in the user interface to users with the corresponding relevant characteristics. FIG. 1 illustrates a customization table which considers only two user characteristics, namely the familiarity level characteristic 10 and the job type characteristic 12. It will be observed that the appropriate operations set for a user with clerical job type characteristic 14 and novice familiarity level characteristic 16 is operations set 18, comprising the operations listed therein.

Figure 2A:
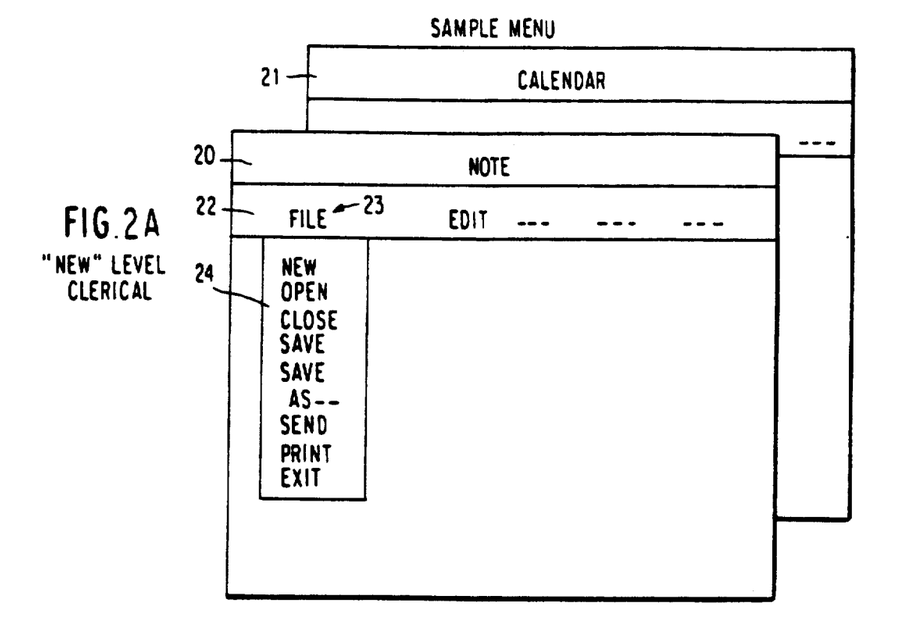
FIG. 2A illustrates a typical menu which may be presented to a novice clerical user in the practice of the invention.
Figure 2B:
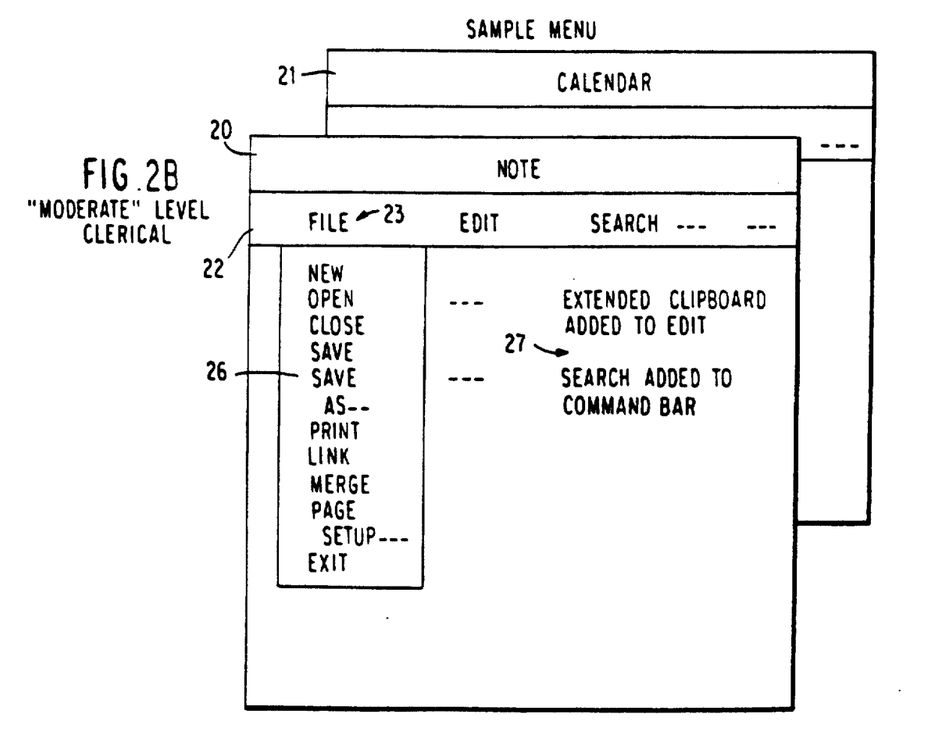
FIG. 2B illustrates a typical menu which may be presented to a moderately experienced clerical user in the practice of the invention.

FIGS. 2A and 2B illustrate two sample user interface menus for a user with clerical job type. FIG. 2A shows a note function 20 overlying a calendar function 21 in a windowing computer display. the note function 20 has a command bar 22, including several commands such as FILE, EDIT and the like. The FILE command 23, when selected, provides the novice familiarity level clerical job type user with operations set in menu 24. In contrast, FIG. 2B illustrates that the moderate familiarity level clerical job type user is provided with an operations set in menu 26 which contains the operations Link, Merge, and Page Setup in addition to the operations shown in operations set in menu 24 of FIG. 2A. The notes at reference numeral 27 indicate the other differences in the user interface for the "moderate" level user. Specifically, an extended clipboard is added to the EDIT function and a SEARCH function has been added to the command bar 22.

Figure 3:
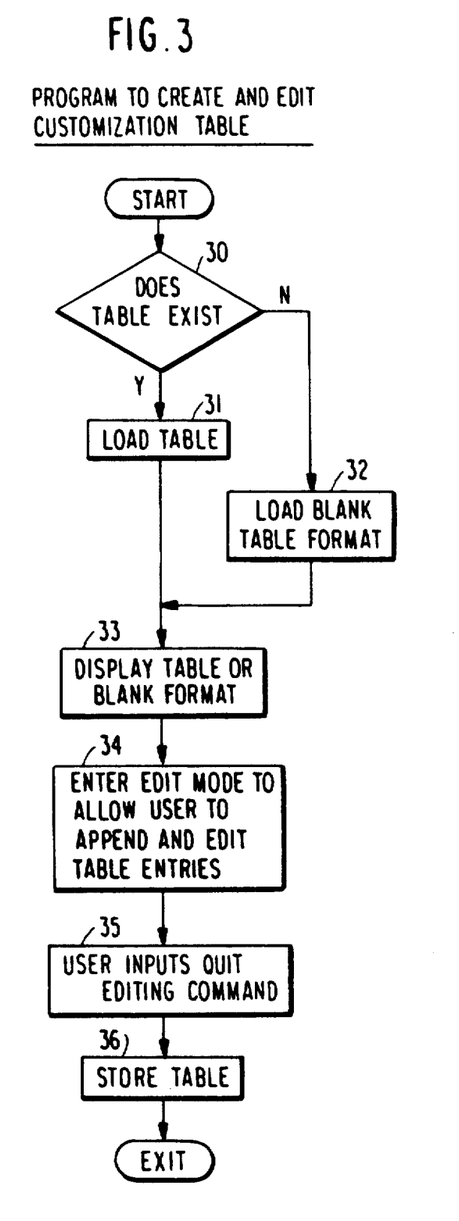
FIG. 3 is a portion of the flow chart which illustrates customization table creation and editing logic.
Figure 4:
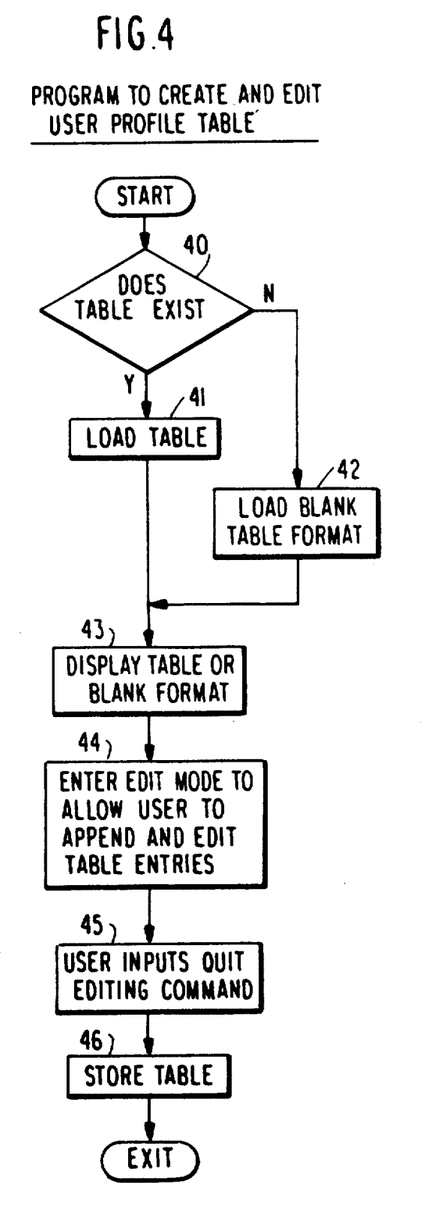
FIG. 4 is a portion of the flow chart which illustrates user profile table creation and editing logic.

FIGS. 3 and 4 illustrate the logic of the programs which create and edit the customization table and the user profile table, both of which are used to generate customized user interfaces for individual users. The customization table and user profile table are searchable aggregations, such as arrays, of multi-field records as are commonly used in computer programming applications and may be created by a variety of known methods such as interactive entry or editing using a text editor, database management system or set of table creation functions embedded within a table maintenance routine specialized to the present invention.

FIG. 3 illustrates the program which creates and edits the customization table. When this program is first invoked, a test is made to determine whether the customization table exists, as indicated in decision block 30. If the table exists, it is loaded into memory as indicated in block 31. If the table does not exist, a blank table format, which contains table characteristics such as field names, field lengths and required data types, is loaded into memory as indicated in block 32. The existing table or the blank table format, as the case may be, is then displayed to the user as indicated in block 33. The program then enters edit mode so that the user may add or delete records and modify fields in the table as indicated in block 34. Editing ends when the user enters the quit editing command as indicated in block 35. The newly created or edited table is then stored in external memory as indicated in block 36.

FIG. 4 illustrates the program which creates and edits the user profile table. When this program is first invoked, a test is made to determine whether the user profile table exists, as indicated in decision block 40. If the table exists, it is loaded into memory as indicated in block 41. If the table does not exist, a blank table format, which contains table characteristics such as field names, field lengths and required data types, is loaded into memory as indicated in block 42. The existing table or the blank table format, as the case may be, is then displayed to the user as indicated in block 43. The program then enters edit mode so that the user may add or delete records and modify fields in the table as indicated in block 44. Editing ends when the user enters the quit editing command as indicated in block 45. The newly created or edited table is then stored in external memory as indicated in block 46.

Figure 5:
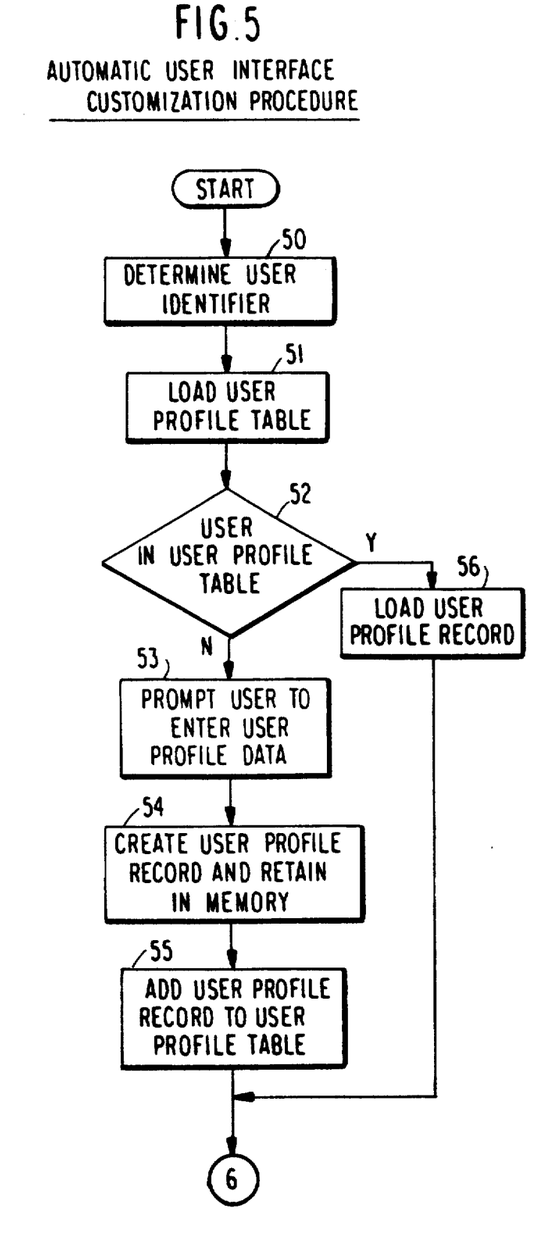
FIG. 5 is a portion of the flow chart which illustrates initialization and user lookup logic.

FIG. 5 illustrates that the automatic customization procedure according to the invention begins by determining the user's identifier in block 50 by known methods such as testing the system variable which contains the current user's identifier or by prompting the user to enter his or her identifier. The user profile table is then loaded into memory as indicated in block 51, and the user profile table is searched for the current user's identifier in decision block 52. If the user's identifier is not found in the user profile table, the user is prompted to enter data into the fields of a blank user profile record which has been created for that particular user, as indicated in block 53. The data input by the user is moved into the appropriate fields to create the user profile record, which is retained in memory for further use, as indicated in block 54. The newly created user profile record is also added to the user profile table as indicated in block 55, and the program moves to block 60 shown in FIG. 6.

Figure 6:
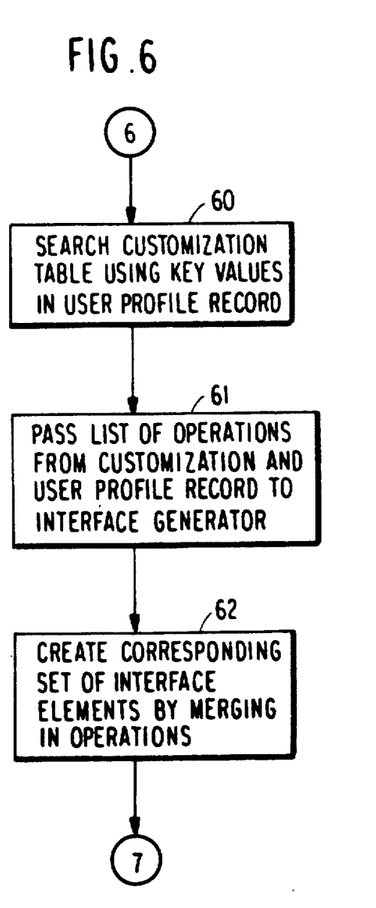
FIG. 6 is a further portion of the flow chart which illustrates operation set creation and interface generation logic.

If, on the other hand, the user identifier is found in the user profile table, the user's profile record is moved from the table into memory as indicated in block 56, and the program moves to block 60 of FIG. 6.

In block 60 of FIG. 6, a multi-key search is carried out in the customization table to find the entry corresponding to the user characteristics specified in the user profile record. Typical user characteristics contained in the user profile record might include the user's job type, level of familiarity with the application program, number of times the user has invoked the application program, data access and modification rights, and others. There is one field of the user profile record which, if it exists, will not be used in the search. This is a field which lists operations individually specified to be added to the user's customized interface in addition to the operations that would be included based solely on the characteristics in the user profile record. The purpose of this is to provide for an arbitrary degree of customization beyond that provided by the generalized sets of operations deemed appropriate to users of various types.

The list of operations which has thus been generated from both the customization table and the individualized operations of the user profile record is passed to the interface generator as indicated in block 61. The interface generator then creates the corresponding set of interface elements, such as menus, application bars, etc., by merging the operations in the list into the appropriate interface screen designs as indicated in block 62.

Figure 7:
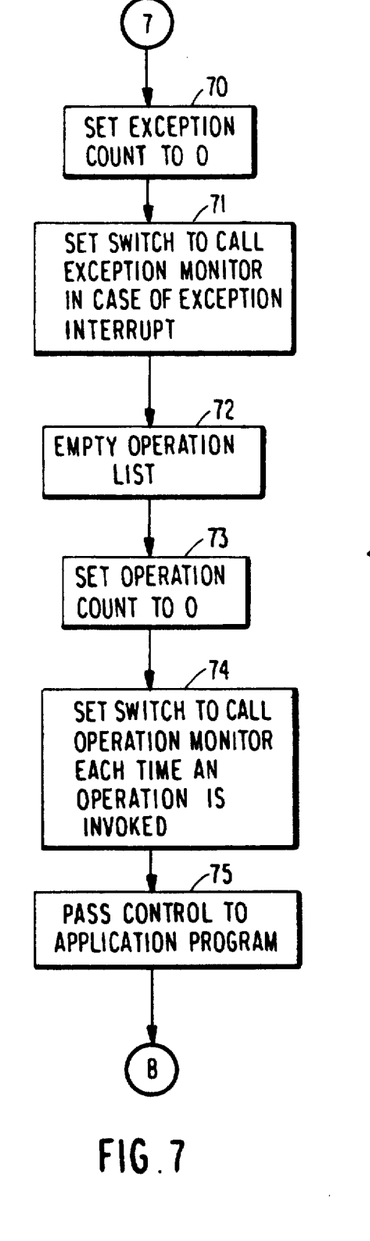
FIG. 7 is a further portion of the flow chart which illustrates exception monitor and operation monitor invocation logic.

In FIG. 7, the exception monitor is invoked by setting the exception count to zero as indicated in block 70 and setting a switch to respond to exception interrupts by calling the exception monitor program as indicated in block 71. The operation monitor is then invoked by emptying the operation list as indicated in block 72, setting the operation count to 0 as indicated in block 73, and setting a switch to call the operation monitor program any time an operation is invoked as indicated in block 74. Control is then passed to the application program for presentation of the top level interface element (e.g., main menu) and use of the application program by the user as indicated in block 75.

Figure 8:
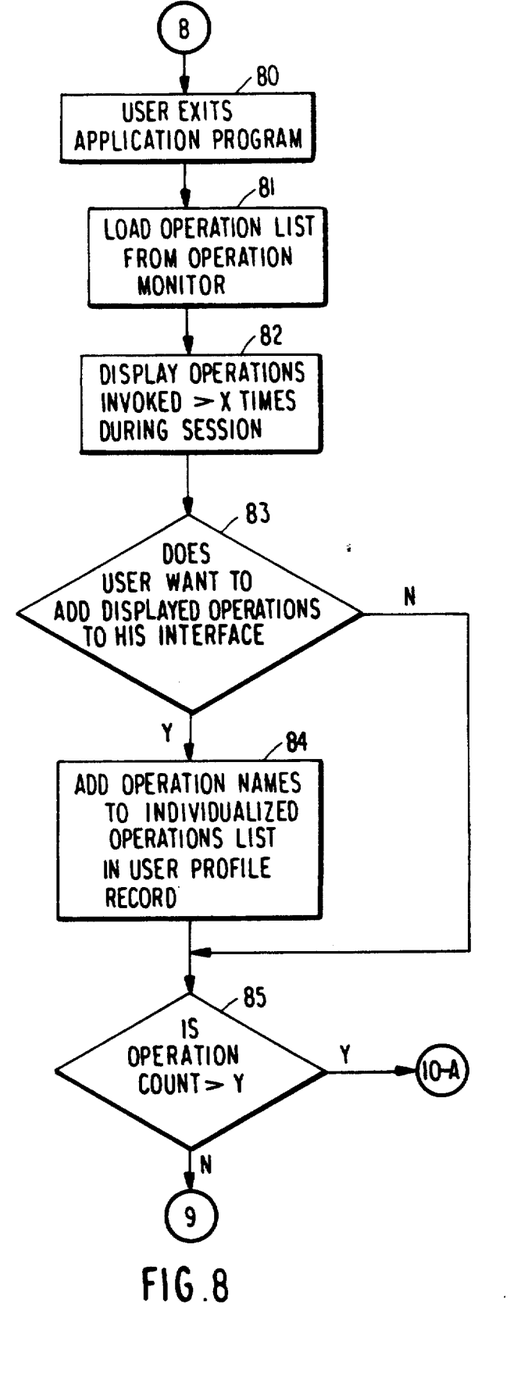
FIG. 8 is a further portion of the flow chart which illustrates exit testing and upgrading logic based on the contents of the operation monitor list and the total in the operation count.

FIG. 8 illustrates the exit routine which is entered after the user exits the application program as indicated in block 80. The operation list is loaded from the operation monitor as indicated in block 81, and the operations which were invoked more than a predetermined number of times x during the session are displayed to the user as indicated in block 82. The user is then asked if he wishes to add the displayed operations to his customized user interface as indicated in decision block 83. If the user answers in the affirmative, the new operations are added to the individualized operation field of the user's user profile record as indicated in block 84 and the program moves to decision block 85. If the user answers in the negative, the program moves directly to decision block 85.

In decision block 85, the operation count is tested to determined whether it contains more than a predetermined number y of entries. If so, the field for the user's experience level is incremented in the user profile record as indicated in block 100 of FIG. 10 and the program moves to block 101. If not, the program moves to decision block 90 of FIG. 9.

Figure 9:
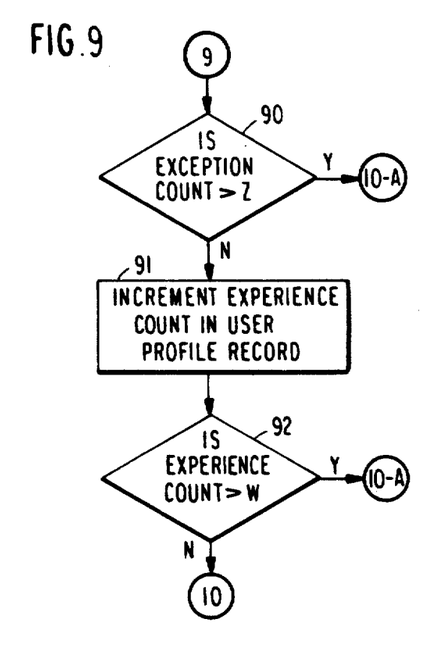
FIG. 9 is a further portion of the flow chart which illustrates exit testing and upgrading logic based on the total in the exception count.

In FIG. 9, the exception count is tested to determine whether the total number of serious errors is less than a predetermined number z as indicated in decision block 90. If so, the field for the user's experience level is incremented in the user profile record as indicated in block 100 of FIG. 10 and the program moves to block 101. If not, the program moves to block 91 of FIG. 9.

The experience count field, which stores the number of times the user has accessed the application program, is incremented in the user profile record as indicated in block 91, and the incremented value is then tested as indicated in decision block 92 to determine whether the value is greater than a predetermined number w. If so, the field for the user's experience level is incremented in the user profile record as indicated in block 100 of FIG. 10 and the program moves to block 101. If not, the program moves directly to block 101.

Figure 10:
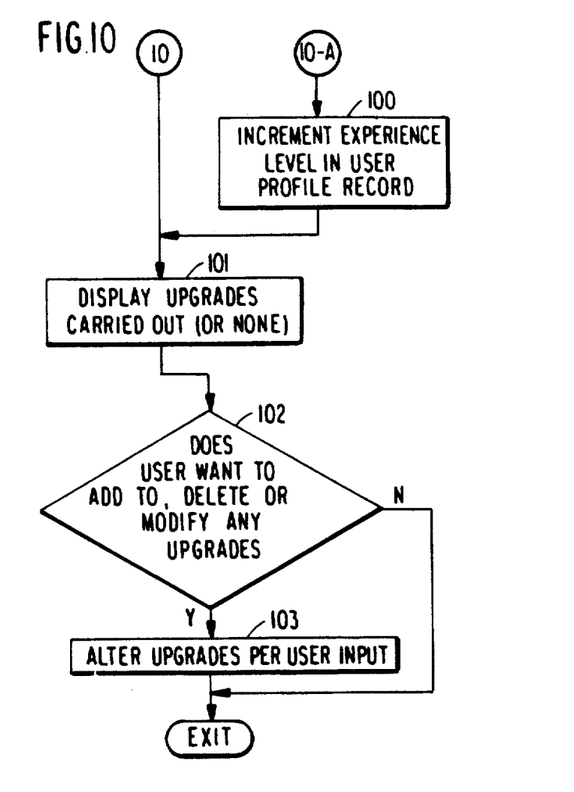
FIG. 10 is a further portion of the flow chart which illustrates exit testing and upgrading logic based on the user's desires.

In FIG. 10, a message is displayed to the user as indicated in block 101 which lists the upgrading actions which have been taken or states that no upgrading actions have been taken, as the case may be. The user is then asked in decision block 102 whether he wishes to add to, delete or change the upgrading actions. If so, the upgrade is modified in accordance with user input as indicated in block 103, and the program terminates. If not, the program terminates directly.

Figure 11:
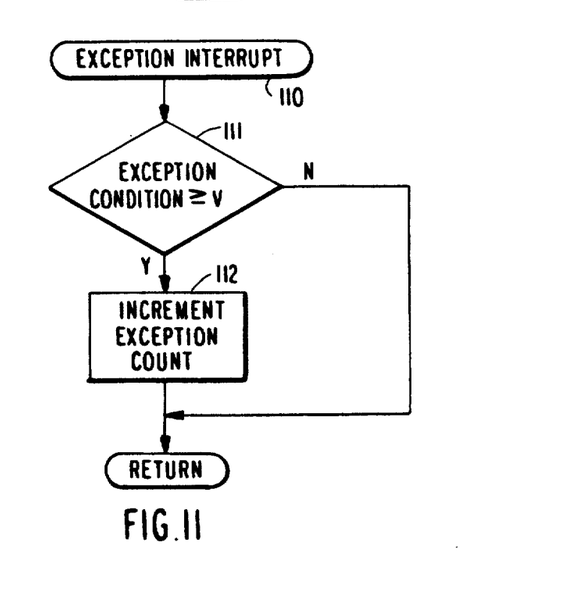
FIG. 11 is a further portion of the flow chart which illustrates exception monitor logic.

FIG. 11 illustrates the operation of the exception monitor. Whenever an exception interrupt is generated as indicated in block 110, it is tested as indicated in decision block 111 to determine whether the severity of the error exceeds a predetermined level. If so, the exception count is incremented as indicated in block 112 and control is returned to the main program. If not, control returns directly to the main program.

Figure 12:
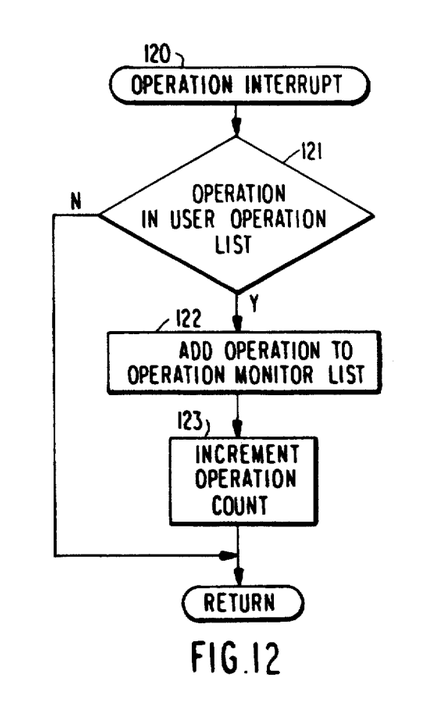
FIG. 12 is a further portion of the flow chart which illustrates operation monitor logic.

FIG. 12 illustrates the operation of the operation monitor. Whenever an operation is invoked as indicated in block 120, it is tested as indicated in decision block 121 to determine whether the operation is already contained in the user's customized interface. If not, the operation is added to the operation list maintained by the operation monitor as indicated in block 122, the operation count is incremented as indicated in block 123, and control is returned to the main program. If so, control returns directly to the main program.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A data processing system which customizes a user interface of an application program to present a limited set of operations based on relevant characteristics of a user comprising:
   means for accepting input data relating to identifiers of actual or potential users of the application program, relevant characteristics of classes of users, and sets of operations of the application program which are appropriate for each class of users;
   means for creating a user profile table which stores said relevant characteristics of individual user in a format which is searchable using an identifier of a user as a key value;
   means coupled to said user profile table creating means, for storing the user profile table for later access;
   means for creating a customization table which stores said sets of operations for each class of users in a format which is searchable using said relevant characteristics of classes of users as key values;
   means coupled to said customization table creating means, for storing the customization table for later access;
   means coupled to said user profile table storing means, for determining relevant characteristics of an individual user when a user invokes the application program;
   means coupled to said customization table storing means and in response to said determining means, for searching the customization table for the appropriate set of operations for a user in his class of users based on relevant characteristics of the user; and
   means coupled to said searching means, for automatically generating user interface components during the running of the application program which present only the operations specified for the user.

2. The data processing system which customizes a user interface of an application program as recited in claim 1 wherein the means for determining relevant characteristics of a user accesses an identifier of a user as a key to search said user profile table.

3. The data processing system which customizes a user interface of an application program as recited in claim 1 further comprising:
   means for maintaining a count of the number of times a user has invoked the application program;
   means for determining a user's level of familiarity with the application program by reference to said count; and
   means for utilizing said level of familiarity with the application program as one of the relevant characteristics of the user in searching the customization table.

4. The data processing system which customizes a user interface of an application program with system determination of the user's level of familiarity with the application program as recited in claim 3 further comprising means for providing a user an option to override the count of times the user has invoked the application program to allow for variations in the time different users take to familiarize themselves with the application program.

5. The data processing system which customizes a user interface of an application program as recited in claim 1 further comprising:
   means for maintaining a count of a number of exception conditions which occur during a user's session with the application program;
   means for increasing a user's level of familiarity with the application program each time a session ends with said count being lower than a predetermined number; and
   means for storing said increased level of familiarity with the application program in the user profile table for searching the customization table in subsequent sessions by the same user with the application program.

6. The data processing system which customizes a user interface of an application program with automatic increasing of a user's level of familiarity with the application program as recited in claim 5 further comprising means for providing the user an option to override said automatic increase in a user's level of familiarity with the application program.

7. The data processing system which customizes a user interface of an application program as recited in claim 1 further comprising:
   means for maintaining a list of operations not in a user's customized operations set which are invoked by the user during a session with the application program;
   means for adding to the user's customized operations set all additional operations from said list which were invoked more than a predetermined number of times within the session; and
   means for utilizing said additional operations in creating the user's customized user interface in subsequent sessions by the same user with the application program.

8. The data processing system which customizes a user interface of an application program with automatic adding of certain operations to a user's customized operations set as recited in claim 7 further comprising means for providing the user an option to override said automatic addition of operations to the user's customized operations set.

9. The data processing system which customizes a user interface of an application program as recited in claim 1 further comprising:
   means for maintaining a count of operations not in a user's customized operations set which are invoked by the user during a session with the application program;
   means for increasing a user's level of familiarity with the application program each time a session ends with said count being higher than a predetermined number; and
   means for storing said increased level of familiarity with the application program in the user profile table for searching the customization table in subsequent sessions by the same user with the application program.

10. The data processing system which customizes a user interface of an application program with automatic increasing of the user's level of familiarity with the application program as recited in claim 9 further comprising means for providing the user an option to override said automatic increase in the user's level of familiarity with the application program.

11. The data processing system which customizes a user interface of an application program as recited in claim 3 further comprising:
   means for maintaining a count of a number of exception conditions which occur during a user's session with the application program;
   means for increasing a user'level of familiarity with the application program each time a session ends with said count being lower than a predetermined number; and
   means for storing said increased level of familiarity with the application program in the user profile table for searching the customization table in subsequent sessions by the same user with the application program.

12. The data processing system which customizes a user interface of an application program with automatic increasing of a user's level of familiarity with the application program as recited in claim 11 further comprising means for providing the user an option to override said automatic increase in a user's level of familiarity with the application program.

13. The data processing system which customizes a user interface of an application program as recited in claim 11 further comprising:
   means for maintaining a list of operations not in a user's customized operations set which are invoked by the user during a session with the application program;
   means for adding to the user's customized operations set all additional operations from said list which were invoked more than a predetermined number of times within the session; and
   means for utilizing said additional operations in creating the user's customized user interface in subsequent sessions by the same user with the application program.

14. The data processing system which customizes a user interface of an application program with automatic adding of certain operations to a user's customized operations set as recited in claim 13 further comprising means for providing the user an option to override said automatic addition of operations to the user's customized operations set.

15. The data processing system which customizes a user interface of an application program as recited in claim 13 wherein the means for determining relevant characteristics of a user accesses an identifier of a user as a key to search said user profile table.

* * * * *